J. T. ANDREW.
SAFETY WHEEL FOR RAILWAY CARS.
APPLICATION FILED FEB. 12, 1910.
956,261.
Patented Apr. 26, 1910.
3 SHEETS—SHEET 2.
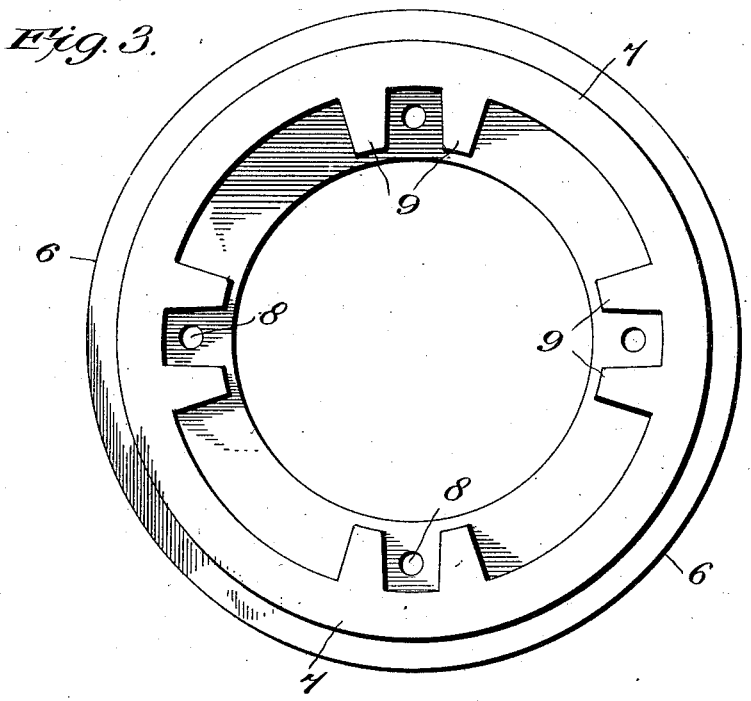
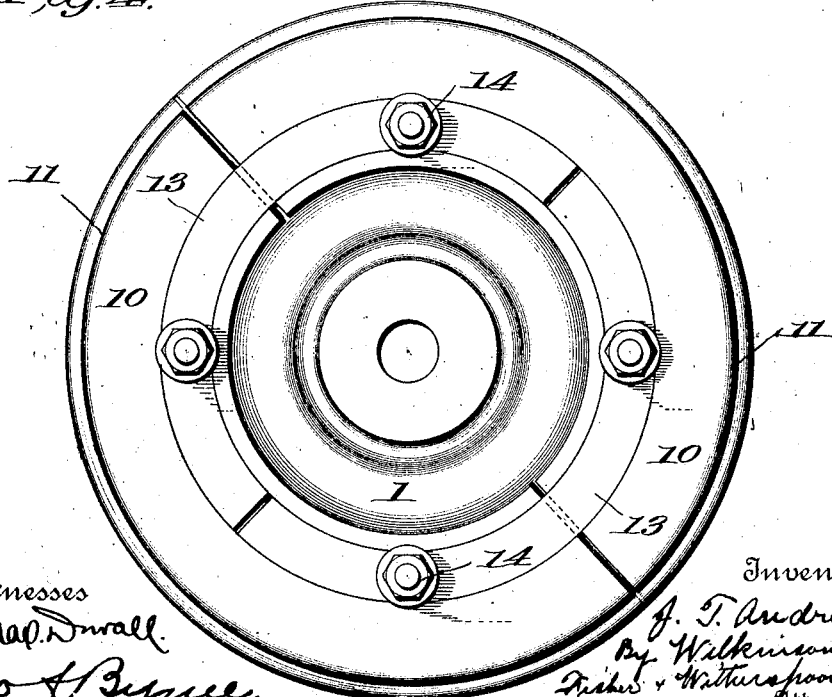

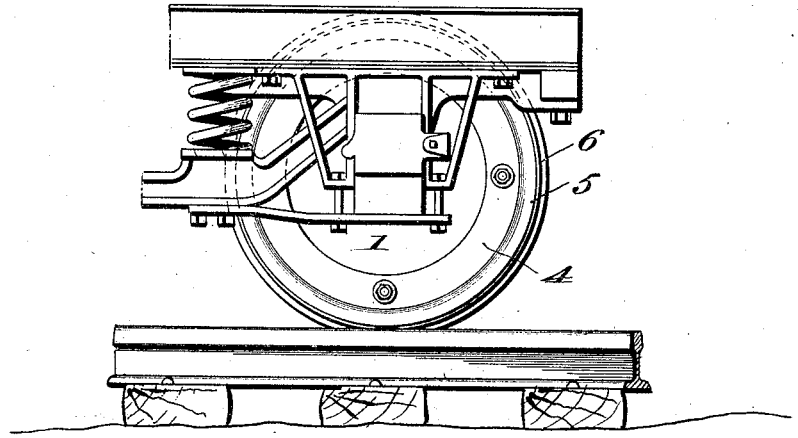
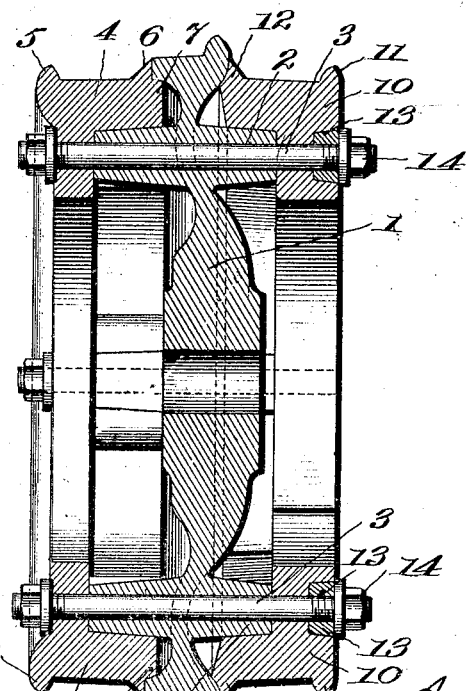

J. T. ANDREW.
SAFETY WHEEL FOR RAILWAY CARS.
APPLICATION FILED FEB. 12, 1910.
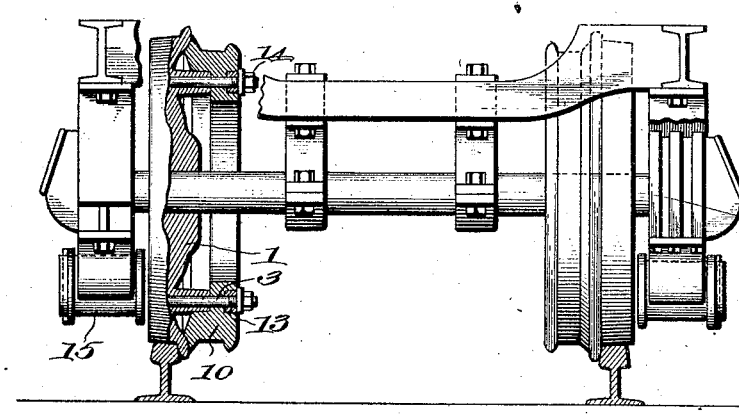
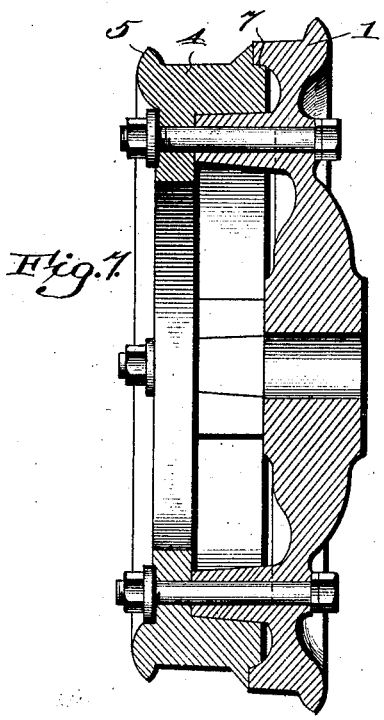
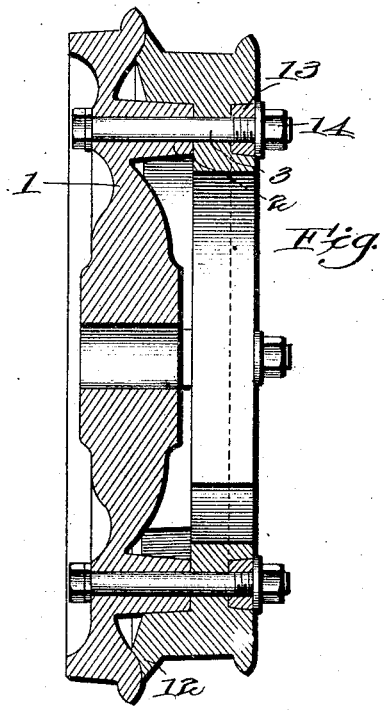

UNITED STATES PATENT OFFICE.

JAMES T. ANDREW, OF MONTGOMERY, ALABAMA.

SAFETY-WHEEL FOR RAILWAY-CARS.

956,261.

Specification of Letters Patent.   Patented Apr. 26, 1910.

Application filed February 12, 1910. Serial No. 543,614.

*To all whom it may concern:*

Be it known that I, JAMES T. ANDREW, a citizen of the United States, residing at Montgomery, in the county of Montgomery and State of Alabama, have invented certain new and useful Improvements in Safety-Wheels for Railway-Cars; and I do hereby declare the following to be a full, clear, and exact description of the invention, such as will enable others skilled in the art to which it appertains to make and use the same.

My invention relates to improvement in the manufacture of wheels intended for use in connection with my safety appliance for railway cars, as set forth, for example, in Patent No. 941,222, dated November 23, 1909.

The object of my invention is to manufacture, in a simple and economical way, a car or locomotive wheel having outside and inside treads in addition to the main central tread, and also to provide means whereby an additional wheel or wheels having safety treads may be applied to the ordinary car or locomotive wheel without removing it from the truck.

With these objects in view, my invention consists in the construction and combinations of parts as hereinafter described and claimed.

In the accompanying drawings—Figure 1 is a side elevation of one corner of a truck, showing my invention applied to the wheel thereof. Fig. 2 is a vertical cross-section through my improved wheel. Fig. 3 is a side view of one of the auxiliary wheels. Fig. 4 is a side view of the inside wheel applied to the main wheel, looking from the inside of the truck. Fig. 5 is a rear view, partly in section, of a truck, showing my improved wheel applied to the wheels thereof. Fig. 6 is an enlarged sectional view of the car wheel shown in Fig. 5, and Fig. 7 is a sectional view of the auxiliary wheel applied to the wheels of the pony truck of a locomotive.

1 represents a car or locomotive wheel made in the usual manner, except that it is provided at intervals with projecting lugs or bosses 2, which are perforated for the passage of bolts 3. The outside wheel 4, which is applied to the main wheel 1, is annular in shape, is provided with an outside tread 5, with an inclined projecting portion 6, and with an internal ring or projection 7, fitting within the edge of the main car wheel, the outside wheel being of slightly smaller diameter than the main wheel 1. This wheel is also provided with perforations 8 for the passage of the bolts 3, and on its inner face is provided with a series of lugs 9, two of said lugs being arranged in proximity to each hole 8, as shown in Fig. 3. The inner wheel 10 is provided with a flange 11 and a part 12, fitting against the inside part of the main wheel 1. The wheel 10 is made in two halves, as shown in Fig. 4, and is annular in shape. By this construction, the inner wheel may be fitted directly to a car truck of the usual pattern without removing the wheels from the truck, and the outer wheel may be fitted directly against the wheels of the locomotive pony truck without removing said wheels from said truck. In fitting these auxiliary wheels to cars and locomotives of ordinary construction, the lugs or bosses 2 would, of course, be absent, but still the construction would be efficient for the purposes desired. One idea of this invention, however, is to have these lugs or bosses 2 made integral with the wheel 1 during the process of making, so that at any time the auxiliary inside or outside wheels may be attached thereto. On the inner part of the two-part wheel 10, a circular depression is formed, and in this depression is located a ring 13, preferably of metal, through which the bolts 3 pass, said bolts being provided with securing nuts 14 at each end. The ring 13 is made in two parts, as shown in Fig. 4, but the joints in the ring are arranged at different points from the joints in the wheel 10.

In Fig. 2 is shown a wheel having auxiliary wheels on both sides, making a compound wheel. In Figs. 5 and 6, an auxiliary car wheel is shown, which may be attached to the inside of the car wheel without removing the same from the truck, by reason of the two-part construction already described, and in Fig. 7 is shown an auxiliary wheel adapted to be applied to the outside of a wheel on the locomotive pony truck, said pony truck being so constructed that an auxiliary wheel may be applied to the outside thereof without interfering with the journals or bearings. In Fig. 5, the inside wheel 10 acts as a safety wheel in case of derailment, as described in my patent above referred to, and on the outside thereof are mounted safety rollers 15, as also described in said patent. By referring to Figs. 6 and 7, it will be obvious that the auxiliary wheel may be applied to the inside of a car wheel or the outside of a locomotive pony truck wheel, without removing the wheels from the trucks.

In case the wheels are manufactured for the first time as a whole, as shown in Fig. 2, it is not necessary to have the inner wheel made in two parts, this construction being adopted for convenience in applying the auxiliary wheels to the car wheels now in use.

I claim:—

1. The combination of a car or locomotive wheel, provided with perforated bosses, and an auxiliary wheel adapted to be fitted against said first named wheel and having parts engaging said bosses, said auxiliary wheel being provided with parts conforming in shape to the shape of the main wheel, so that they may be closely fitted together, and means for securing said wheels together, substantially as described.

2. The combination of a car or locomotive wheel, provided with perforated bosses, an annular auxiliary wheel provided with parts so shaped that it may fit closely against the main wheel, said auxiliary wheel being provided with lugs extending on either side of said perforated bosses, and bolts and nuts passing through said bosses and binding both of said wheels together, substantially a described.

3. A safety wheel adapted to run on a prepared track, composed of a main central wheel having a flange and two auxiliary wheels adapted to fit closely against the main wheel and to be secured thereto, each of said auxiliary wheels being provided with a flange, substantially as described.

4. A safety wheel composed of a central wheel provided with a guiding flange and auxiliary wheels adapted to be secured to and rest closely against the faces of said wheel, and means for securing the three wheels together, the inner wheel being made of separable parts substantially as described.

5. A safety wheel composed of a central wheel provided with a flange and with perforated bosses, and two auxiliary wheels adapted to be secured against said central wheel on either side thereof, each of said auxiliary wheels being provided with a flange, and said auxiliary wheels being perforated, and bolts passing through said auxiliary wheels and through the bosses in said central wheel, substantially as described.

6. A safety wheel composed of a central wheel having a flange and perforated bosses, and auxiliary wheels adapted to be secured against said central wheel, the outer auxiliary wheel being provided with lugs located on either side of said bosses, and the inner auxiliary wheel being made in two parts, each of said auxiliary wheels being provided with a flange, and bolts passing through all three of said wheels and uniting them together, substantially as described.

7. A safety wheel composed of a central main wheel having a flange and perforated bosses, and two auxiliary wheels adapted to be fitted one against each face of said main wheel, and having portions closely fitting against the sides of said main wheel, the outer wheel being made in one piece and having a pair of lugs embracing each of the outwardly projecting bosses on the main wheel, and the inner wheel being annular and made in two halves, and a two-part ring located in a recess in said second named wheel, both of said auxiliary wheels being provided with flanges and bolts passing through said wheels, bosses, and rings and provided with securing nuts, substantially as described.

In testimony whereof, I affix my signature, in presence of two witnesses.

JAMES T. ANDREW.

Witnesses:
FELIX ROBINSON,
W. J. PICKETT.